United States Patent Office 3,188,024
Patented June 8, 1965

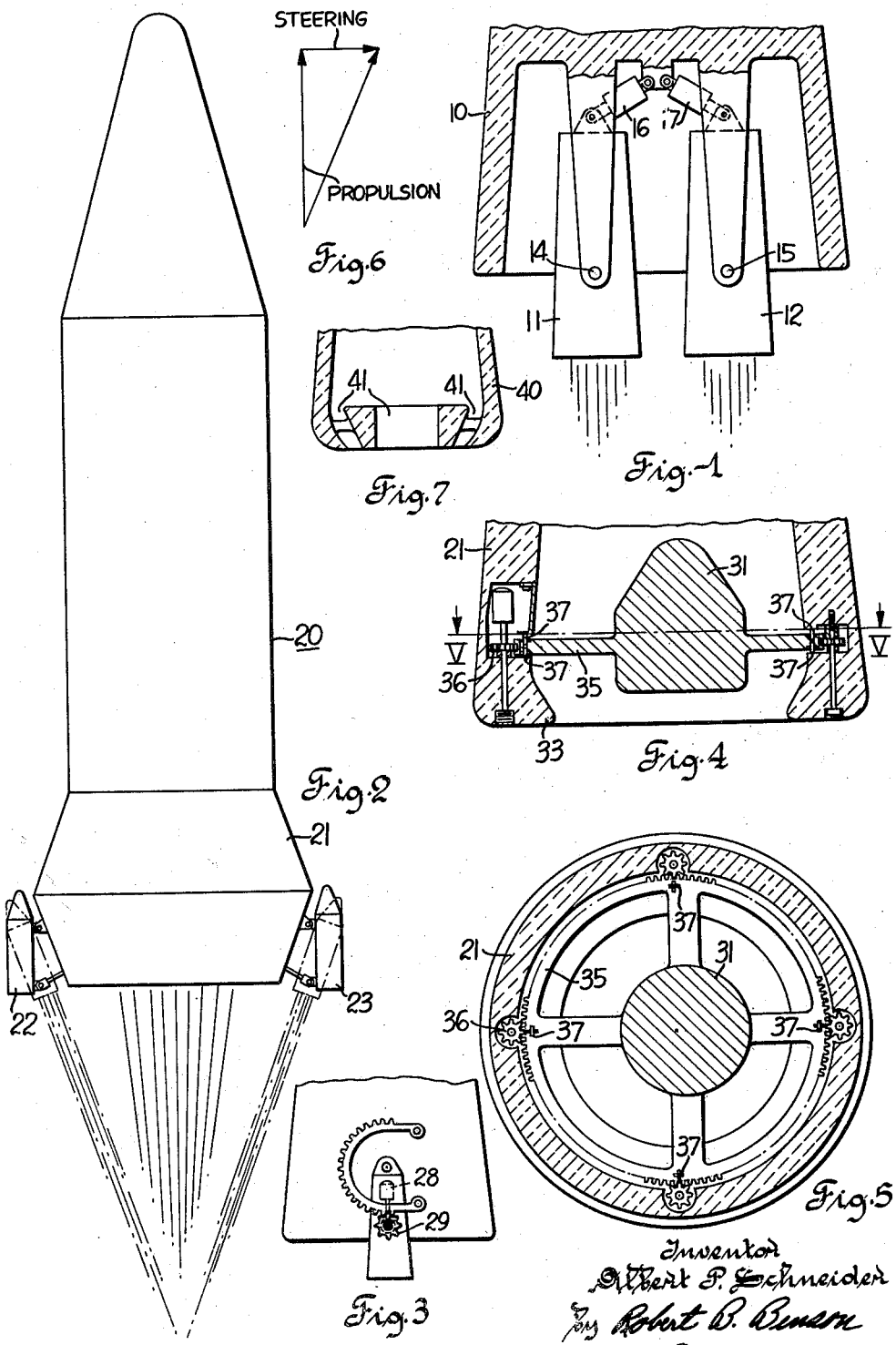

3,188,024
AIRCRAFT STEERING AND PROPULSION UNIT
Albert Peter Schneider, 1339 S. 49th St.,
Milwaukee 14, Wis.
Filed May 6, 1963, Ser. No. 278,042
5 Claims. (Cl. 244—52)

This invention relates generally to rockets, airplanes and other vehicles designed for use in high altitudes and outer space and are referred to in connection with this invention as aircraft or space craft. These craft are usually propelled by reaction type motors or engines. More specifically this invention relates to means for propelling and steering such a vehicle in space.

One of the problems with the present day space craft is providing an effective means for both steering and propelling the craft in outer space. One of the factors in this problem is the reduced reactive effect obtained by the reaction type motor in the rarefied air in the outer atmosphere and the stratosphere. Many present day space craft are provided with equipment in addition to the reaction motor for steering and maneuverability in outer space.

This invention contemplates the use of pivotally mounted reaction type motors on space craft so that the direction of the exhaust of these motors can be directed to intersect and thereby increase the propulsion on the craft in rarefied atmosphere. Furthermore, it is contemplated that the pivotally mounted reaction engines of the space craft be used to obtain a steering effect by controlling the direction of the exhaust. It is further contemplated that by pivotally mounting the reaction engines of the craft, they can be used to provide a deceleration effect on the space craft as it reenters the atmosphere thereby reducing one of the problems an object encounters when it reenters the atmosphere.

Therefore, it is the object of this invention to provide a new and improved propulsion unit for space craft.

Another object of this invention is to provide a new and improved combination propulsion and steering unit for space craft.

Another object of this invention is to provide a new and improved pivotally mounted propulsion unit for space craft which can be used for steering and decelerating a space craft.

Other objects and advantages of this invention will be apparent from the following description when read in connection with the accompanying drawing in which:

FIG. 1 is a cross section view of the propulsion portion of a space craft of this invention having two pivotally mounted reaction type engines;

FIG. 2 is a plan view of a space craft having a main propulsion engine and a pair of pivotally mounted reaction type engines used for steering the craft;

FIG. 3 is a partial cut-away view of a reaction type steering engine of FIG. 1 mounted to pivot 180° so as to be used for decelerating the craft;

FIG. 4 is a cross section view of exhaust portion of a space craft embodying a modified version of this invention in which a cone is positioned within the exhaust duct of the craft;

FIG. 5 is a cross section view taken along the line V—V of FIG. 4;

FIG. 6 is a vector diagram showing the relative steering and propulsion forces from an engine inclined relative to the craft; and FIG. 7 is a cross section view of the exhaust passage of a space craft showing another embodiment of this invention.

Referring more specifically to the drawings, the invention is illustrated in FIG. 1 in connection with the rear portion of a space craft 10 having a pair of engines 11 and 12. It is contemplated that these engines be of the reaction type which obtain thrust by the reaction on the space craft by gases escaping from the engines. When the space craft is in outer space in a rarefied air atmosphere, the total amount of thrust obtained from this type of engine is reduced. This invention contemplates that under these conditions the gas escaping from the reaction engines be directed so as to intersect the exhaust stream from the other engine and thereby increase the overall propulsion effect on the space craft. To this end the propulsion engines 11 and 12 are pivotally connected to the space craft 10 in a manner so that they can be moved through an arc which will cause the gas escaping from the engines to intersect in a number of selected arrangements. Any suitable means can be provided for pivotally moving the engines; however, as shown in FIG. 1, the engines 11 and 12 are pivotally connected to the space craft at points 14, 15, respectively, near the rear end of the engines. Hydraulic rams 16, 17 are provided on the craft 10 and connected to the forward end of the engines for moving the engines in an arc around the pivot points.

When the engines are moved from the direct line of motion of the space craft, the thrust on the craft can be illustrated by a vector diagram as shown in FIG. 6. The vector in the line of the motion of the craft is referred to as the propulsion force. The other vector at 90° relative to the propulsion vector can be used to steer the craft and cause it to deviate from its direction of travel and is referred to as the steering vector. Therefore, by selectively choosing the angles at which the engines are positioned and hence the angles at which the exhaust streams therefrom intersect, the direction of the space craft can be altered. Furthermore, the direction of the craft can also be modified by varying the amount of exhaust from either engine to thereby vary the amount of thrust being exerted by that engine. Varying the volume of exhaust plus the selective control of the position of the engines provides an even greater control over the steering of the craft.

This invention is based in part on the theory that added thrust can be obtained from a reaction type motor by directing the escaping gases to intersect with the exhaust of another such engine. The escaping gas upon hitting the relatively dense exhaust gas of another engine slows down and exerts a reverse force on the oncoming exhaust from its own engine which in turn reacts with other gas until a force is exerted on the craft. This force is in the direction of travel of the craft and supplements the reaction force of the engines. Therefore, any number of such motors could be mounted on a space craft in a manner so that they could intersect the exhaust of another such motor and thereby provide an infinite variation of directional control for the craft.

A variation of this invention is illustrated in FIG. 2 in connection with a space craft 20 that has a single primary propulsion engine 21 and a pair of smaller guiding or steering engines 22, 23 all of the reaction type. In this unit, only the steering engines are pivotally mounted and they are mounted on the craft in a manner that their exhaust will intersect with the exhaust of the other steering motor and the exhaust of the main propulsion engine 21. One of he obvious advantages of this arrangement is that only the much smaller steering engines have to be pivotally mounted on the space craft thereby greatly reducing the problems of mounting the engines on the craft. Although it is intended that the smaller engines only be used for steering, they can be used during a time when the main propulsion unit is in operation to provide additional thrust. In connection with this unit, the steering engines can be mounted to pivot to an angle of 180° as shown in FIG. 3. Any suitable means can be used for pivoting the engine such as the illustrated motor 28 and gear drive 29. The purpose of such an arrangement is that these engines can then be used to slow down the speed of the rocket just prior to the rocket's return to the atmosphere for landing.

The space craft in FIG. 4 illustrates a further modification of this invention. In this craft, a cone shaped member 31 is positioned in the exhaust passage or housing 21 of the rocket engine. This cone shaped member 31 causes the gases escaping from the engine to flow through a reduced area to increase the velocity of the gases. On the outer side of the cone, the gases are directed inward by an annular flange 33 so that the gases on the outer side of the cone are directed against each other. The interaction of the exhaust gases will supplement the reaction force on the engine of the craft.

The cone shaped member 31 is connected to a ring 35 and is mounted eccentrically within the exhaust passage and is movable within the exhaust housing to vary the space between the sides of the housing and the cone to force more of the exhaust gas to flow on one side of the cone than the other. In this manner, the direction of the craft can be controlled. For example, the larger volume of the gas flowing on one side of the cone and engaging the rear curved portion of the flange will be a larger force than the gas engaging the other side of the flange. Thus, an unbalanced force acts on the housing tending to turn the craft in the direction of the wider opening between the walls of the exhaust passage and the cone shaped member.

The rear end of an exhaust housing is shown in FIG. 7. This exhaust housing 40 illustrates a further modification of the invention in which the exhaust flows through a plurality of ducts 41 which are arranged to direct the individual exhaust streams to intersect the exhaust stream from one of the other ducts 41. In this way each individual exhaust stream is directed into another exhaust stream and hence encounters greater resistance than if it were directed into the rarefied air in outer space. If desired, means could be provided for varying the size of the ducts 41 to provide a steering control for this engine.

In operation, the pivotally mounted engines on the craft of FIG. 2 can be used for controlling the direction of the craft as well as propelling it. As the craft 10 enters the rarefied atmosphere, the engines are pivoted so that their exhausts intersect. This then increases the overall thrust on the craft and in spite of the fact that the full propulsion effect is not directly in line with the desired direction of travel, a greater force will be exerted on the craft thereby increasing its velocity. The transverse force caused by the direction of the engines' exhaust can be used for steering the craft by selectively determining the angles at which the exhaust from the engines intersect. However, if the angles of the motors relative to the primary direction of travel and the volume of gas escaping from the engines are the same, the transverse thrust of the engines will be equal and opposite, and will cancel out. Hence, the steering forces are balanced and the craft will continue on its path. However, by varying either direction of one of the engines or the volume of gas escaping from one of the engines, the transverse thrust will become unbalanced and will cause the craft to change direction. Hence, by selectively controlling either the position of one or both of the engines and/or the volume of gases escaping from one or both of the engines, the direction of the craft can be selectively changed and controlled.

In the event that further direct propulsion of the rocket is not required, the engines 11, 12 can be shut off and used solely for steering; hence, they could only be operating when a change in direction is required. In this case, the angle of intersection of the gases from the engines could be made much greater so as to increase the transverse thrust relative to the direct thrust of the engines. However, it would still be desirable to use both engines so as to provide a denser atmosphere into which the gases can be exhausted and thereby increase the thrust on the craft.

The operation of the craft illustrated in FIG. 1 is substantially the same as the operation of the craft in FIG. 2 except that the propulsion engines 22 and 23 are used primarily for steering and only incidentally for propulsion of the rocket. In this craft having a main propulsion engine 21, the angle at which exhaust from the steering engines 22 or 23 intersect the exhaust from the primary engine 21 or the exhaust from the other steering engine is made as great as possible so as to provide a maximum steering thrust from the steering engines in comparison to the thrust of direction in travel and thereby increase the steering control with a smaller amount of fuel. Also, in connection with this unit, the steering rocket can be pivoted 180° as shown in FIG. 3 and used to slow down the speed of the craft in the rarefied atmosphere prior to its entering the denser air in the atmosphere.

The craft illustrated in FIG. 4 uses a cone shaped member to control the direction of the gases flowing through the exhaust housing and thereby obtain a maximum propulsion force. In addition, the cone member which is eccentrically mounted in the exhaust housing can be moved toward one side or the other of the housing to force a greater volume of gas flow on one side or the other of the cone. The resulting differential force on portions of the rear curved flange 33 of the craft exhaust passage is used to control the direction of travel of the craft. The cone 31 is moved by rotating the ring 35 by the motor driven gear drive 36. A plurality of gear type rollers 37 are spaced around the ring and mounted in the exhaust housing to make it easier to rotate the ring and cone.

Although but four embodiments of this invention have been illustrated and described, it will be apparent to those skilled in the art that various modifications and changes can be made therein without departing from the spirit of the invention or the scope of the appended claims.

Having now particularly described and ascertained the nature of my said invention and the manner in which it is to be performed, I declare that what I claim is:

1. An aircraft, a pair of rocket engines pivotally mounted on said craft, means for pivoting said engines to selectively position said engines relative to said craft, said engines being arranged so that the exhaust from either of said engines can be directed to intersect the exhaust from the other of said engine to steer said craft.

2. An aircraft comprising: a body, a main propulsion engine connected to said body, a pair of reaction type steering engines pivotally mounted on said body, means for pivoting said steering engines to selectively position said engines relative to said body, said steering engines being arranged so that the exhaust from either of said engines can be directed to intersect the exhaust from the other of said engines to steer said craft.

3. The craft of claim 2 in which the main propulsion engine is of the reaction type and the steering engines are arranged so they can be made to intersect the exhaust from the main propulsion engine.

4. An aircraft comprising: a body, a reaction type engine mounted on said body, an exhaust housing attached to said engine and extending outwardly therefrom, said housing having an inwardly extending flange near its outer end for directing the exhaust from said engine, a cone shaped member mounted in said housing to deflect the exhaust from said engine, means for moving said member transversely relative to said housing to control the volume of exhaust flowing between either side of said cone and said housing to steer said craft.

5. An aircraft comprising: a body, a plurality of reaction type engines pivotally mounted on said body, means for pivoting said engines, said engines being arranged on said body so that the exhaust from each of said engines can be directed to intersect the exhaust from at least one of the other said engines to steer said craft.

References Cited by the Examiner
UNITED STATES PATENTS

| | | | |
|---|---|---|---|
| 2,693,079 | 11/54 | Rau | 244—74 X |
| 2,857,119 | 10/58 | Morguloff | 244—52 |
| 3,064,419 | 11/62 | Ward | 244—52 X |
| 3,068,642 | 12/62 | Schmidt | 244—52 X |

OTHER REFERENCES

Flight, pages 42, 43, January 13, 1961.

FERGUS S. MIDDLETON, *Primary Examiner.*

ANDREW H. FARRELL, MILTON BUCHLER,
*Examiners.*